United States Patent
Okuzawa

(10) Patent No.: US 8,190,617 B2
(45) Date of Patent: May 29, 2012

(54) INFORMATION TRANSMITTING APPARATUS, TERMINAL APPARATUS AND METHOD THEREOF

(75) Inventor: Nozomu Okuzawa, Tokyo (JP)

(73) Assignee: Sony Corporation, Tokyo (JP)

( * ) Notice: Subject to any disclaimer, the term of this patent is extended or adjusted under 35 U.S.C. 154(b) by 95 days.

(21) Appl. No.: 10/568,968

(22) PCT Filed: Sep. 14, 2004

(86) PCT No.: PCT/JP2004/013720
§ 371 (c)(1),
(2), (4) Date: Feb. 22, 2006

(87) PCT Pub. No.: WO2005/031611
PCT Pub. Date: Apr. 7, 2005

(65) Prior Publication Data
US 2007/0094258 A1    Apr. 26, 2007

(30) Foreign Application Priority Data
Sep. 26, 2003 (JP) .................................. 2003-335990

(51) Int. Cl.
G06F 7/00 (2006.01)
(52) U.S. Cl. ........................................ 707/749; 707/913
(58) Field of Classification Search .................. 707/749, 707/913
See application file for complete search history.

(56) References Cited

U.S. PATENT DOCUMENTS

| | | | |
|---|---|---|---|
| 7,092,952 B1 * | 8/2006 | Wilens | 707/100 |
| 7,853,600 B2 * | 12/2010 | Herz et al. | 707/749 |
| 2001/0008404 A1 * | 7/2001 | Naito et al. | 345/745 |
| 2001/0054054 A1 * | 12/2001 | Olson | 709/1 |
| 2002/0078029 A1 * | 6/2002 | Pachet | 707/707 |
| 2002/0083157 A1 * | 6/2002 | Sekiguchi et al. | 709/219 |
| 2003/0083086 A1 * | 5/2003 | Toyryla et al. | 455/518 |
| 2003/0206710 A1 * | 11/2003 | Ferman et al. | 386/46 |
| 2004/0030741 A1 * | 2/2004 | Wolton et al. | 709/202 |
| 2004/0034631 A1 * | 2/2004 | Julliard et al. | 707/4 |
| 2004/0210661 A1 * | 10/2004 | Thompson | 709/228 |

(Continued)

FOREIGN PATENT DOCUMENTS

JP    2000-187666    7/2000

(Continued)

OTHER PUBLICATIONS

Umeki, Hideo et al., "Supporting Network Community Formation", Information Processing Society of Japan, vol. 2000, No. 63, pp. 25-30, Jul. 2000. (with English abstract).

(Continued)

*Primary Examiner* — Shahid Alam
*Assistant Examiner* — Alexandria Bromell
(74) *Attorney, Agent, or Firm* — Oblon, Spivak, McClelland, Maier & Neustadt, L.L.P.

(57) ABSTRACT

A portal server 4 determines that a user C, . . . whose taste information INCc, . . . include URLs corresponding to all the music information pages that a user A is interested in are persons each having a similar taste to the user A and introduces, to the user A, the "Japanese nursery rhymes group", . . . that the user C, . . . belong to. As a result, the user A can receive introduction of a group that is likely to match his or her taste simply by requesting the introduction of a group that matches his or her taste.

21 Claims, 17 Drawing Sheets

U.S. PATENT DOCUMENTS

| | | | |
|---|---|---|---|
| 2005/0060701 A1 | 3/2005 | Murase | |
| 2005/0091679 A1 | 4/2005 | Tanaka et al. | |
| 2005/0160270 A1* | 7/2005 | Goldberg et al. | 713/176 |
| 2005/0267818 A1* | 12/2005 | Kaplan | 705/26 |
| 2006/0074727 A1* | 4/2006 | Briere | 705/8 |
| 2007/0156677 A1* | 7/2007 | Szabo | 707/707 |
| 2007/0233839 A1* | 10/2007 | Gaos | 709/223 |
| 2008/0077462 A1* | 3/2008 | Patel et al. | 705/7 |
| 2009/0234878 A1* | 9/2009 | Herz et al. | 707/707 |
| 2009/0254971 A1* | 10/2009 | Herz et al. | 726/1 |
| 2010/0050078 A1* | 2/2010 | Refuah et al. | 715/706 |

FOREIGN PATENT DOCUMENTS

| | | |
|---|---|---|
| JP | 2001-243213 | 9/2001 |
| JP | 2003-242376 | 8/2003 |
| WO | WO 02/25459 A1 | 3/2002 |

OTHER PUBLICATIONS

U.S. Appl. No. 10/526,902, filed Aug. 16, 2005, Yamashita et al.
U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murase et al.
U.S. Appl. No. 10/556,728, filed Nov. 14, 2005, Iwatsu et al.
U.S. Appl. No. 10/563,315, Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.

* cited by examiner

FIG. 9

| AR1 → FAVORITES | ¥"JAPANESE NURSERY RHYMES GROUP" |
|---|---|
| "ABOUT NURSERY RHYMES" | GROUP NUMBER: 1 |
| "SECRET OF RED DRAGONFLY" | |
| "INVITATION TO HOMETOWN SONGS" | |
| "ASSOCIATION OF NURSERY RHYMES OF TSUGARU" | |
| "GRANDFATHER'S CLOCK" | |

| FAVORITIES | NUMBER OF HITS:4 |
|---|---|
| "ABOUT NURSERY RHYMES" | ¥"PREFERENCE INFORMATION OF USER C" (NUMBER OF THE SAME URLS:5)<br>- "JAPANESE NURSERY RHYMES GROUP" |
| "SECRET OF RED DRAGONFLY" | ¥"PREFERENCE INFORMATION OF hanako" (NUMBER OF THE SAME URLS:3)<br>- "NURSERY RHYMES OF THE WORLD GROUP" |
| "INVITATION TO HOMETOWN SONGS" | ¥"PREFERENCE INFORMATION OF taro" (NUMBER OF THE SAME URLS:1)<br>- "JAPANESE POPS GROUP" |
| "ASSOCIATION OF NURSERY RHYMES OF TSUGARU" | ¥"PREFERENCE INFORMATION OF matsu" (NUMBER OF THE SAME URLS:1)<br>- "JAPANESE FOLKSONGS GROUP" |
| "GRANDFATHER'S CLOCK" | |
| | |
| | |

| FAVORITES | NUMBER OF HITS: 4 |
|---|---|
| "ABOUT NURSERY RHYMES" | ¥"PREFERENCE INFORMATION OF USER C"(NUMBER OF THE SAME URLS:5)<br>  - "JAPANESE NURSERY RHYMES GROUP"<br>    ├ INVITATION TO HOMETOWN SONGS<br>    ├ ACORN SONG<br>    ├ ABOUT NURSERY RHYMES<br>    ├ SECRET OF RED DRAGONFLY<br>    ├ GRANDFATHER'S CLOCK<br>    ├ ASSOCIATION OF NURSERY RHYMES OF TSUGARU<br>    └ BUBBLE SONG |
| "SECRET OF RED DRAGONFLY" | |
| "INVITATION TO HOMETOWN SONGS" | |
| "ASSOCIATION OF NURSERY RHYMES OF TSUGARU" | ¥"PREFERENCE INFORMATION OF hanako"(NUMBER OF THE SAME URLS:3)<br>  - "NURSERY RHYMES OF THE WORLD GROUP" |
| "GRANDFATHER'S CLOCK" | ¥"PREFERENCE INFORMATION OF taro"(NUMBER OF THE SAME URLS:1)<br>  - "JAPANESE POPS GROUP" |
| | ¥"PREFERENCE INFORMATION OF matsu"(NUMBER OF THE SAME URLS:1)<br>  - "JAPANESE FOLKSONGS GROUP" |

| FAVORITES | NUMBER OF HITS: 4 |
|---|---|
| "ABOUT NURSERY RHYMES" | ¥"PREFERENCE INFORMATION OF USER C" (NUMBER OF THE SAME URLS: 5)<br>— "JAPANESE NURSERY RHYMES GROUP"<br>├ INVITATION TO HOMETOWN SONGS<br>├ ACORN SONG<br>├ ABOUT NURSERY RHYMES<br>├ SECRET OF RED DRAGONFLY<br>├ GRANDFATHER'S CLOCK<br>├ ASSOCIATION OF NURSERY RHYMES OF TSUGARU<br>└ BUBBLE SONG |
| "SECRET OF RED DRAGONFLY" | |
| "INVITATION TO HOMETOWN SONGS" | |
| "ASSOCIATION OF NURSERY RHYMES OF TSUGARU" | |
| "GRANDFATHER'S CLOCK" | ¥"PREFERENCE INFORMATION OF hanako" (NUMBER OF THE SAME URLS: 3)<br>— "NURSERY RHYMES OF THE WORLD GROUP" |
| "ACORN SONG" | ¥"PREFERENCE INFORMATION OF taro" (NUMBER OF THE SAME URLS: 1)<br>— "JAPANESE POPS GROUP" |
| | ¥"PREFERENCE INFORMATION OF matsu" (NUMBER OF THE SAME URLS: 1)<br>— "JAPANESE FOLKSONGS GROUP" |

AR1

ADD AND DISPLAY

| FAVORITES | NUMBER OF HITS: 2 |
|---|---|
| "ABOUT NURSERY RHYMES" | ¥"PREFERENCE INFORMATION OF USER C" - "JAPANESE NURSERY RHYMES GROUP"<br>¥"PREFERENCE INFORMATION OF kato" - "JAPANESE NURSERY RHYMES GROUP" |
| "SECRET OF RED DRAGONFLY" | |
| "INVITATION TO HOMETOWN SONGS" | |
| "ASSOCIATION OF NURSERY RHYMES OF TSUGARU" | |
| "GRANDFATHER'S CLOCK" | |
| | |
| | |

AR1

INFORMATION TRANSMITTING APPARATUS, TERMINAL APPARATUS AND METHOD THEREOF

TECHNICAL FIELD

The present invention relates to an information transmission apparatus, a terminal apparatus, and methods thereof, which are preferably applied to a system that allows a user participating in a given system to effectively receive introduction of a given group consisting of persons sharing the same taste with him or her.

BACKGROUND ART

Conventionally, a system that grasps tastes of users participating in a given system and provides recommendation information (recommendation information related to CD (Compact Disk), etc.) to encourage the users to buy goods and the like on a per user basis based on the grasped tastes has been proposed. In such a system, a server on the system administration side counts taste information indicating tastes of users and, based on the count result, transmits various recommendation information on a per user basis (refer to, for example, Patent document 1).

[Patent Document 1]

Jpn. Pat. Appln. Laid-Open Publication No. 2000-48046

However, such a system only allows the system administration side to unilaterally provide the recommendation information to users, so that there is a little benefit for the users participating in the system.

If, for example, the system has a feature that introduces a given group consisting of users sharing the same taste to respective users to promote exchanges between users, it becomes more attractive for the users and this may increase the number of users that utilize this system.

DISCLOSURE OF INVENTION

The present invention has been made in view of the above point, and an object thereof is to provide an information transmission apparatus, a terminal apparatus, and methods thereof that allow a user to effectively receive introduction of a given group consisting of users sharing the same taste with him or her.

To solve the above problem, in the present invention, an information transmission apparatus comprises: a reception means for receiving first taste information that represents the taste of a user from a terminal apparatus of the user; a storage means for storing a plurality of taste information that represent respectively the tastes of a plurality of other users; a search means for searching for second taste information having a resemblance to the first taste information from the plurality of taste information stored in the storage means; and a transmission means for transmitting at least attribute information of the other users that corresponds to the second taste information to the terminal apparatus of the user.

Further, in the present invention, a terminal apparatus comprises: a transmission means for transmitting first taste information that represents the taste of a user to a predetermined apparatus that stores a plurality of taste information that represent respectively the tastes of a plurality of other users; and a reception means for receiving attribute information of the other users that corresponds to the second taste information, the attribute information being information that the predetermined apparatus that has received the first taste information at least transmits after searching for second taste information having a resemblance to the first taste information from the plurality of taste information stored therein.

Further, in the present invention, an information transmission method comprises: a reception step of receiving first taste information that represents the taste of a user from a terminal apparatus of the user; a search step of searching for second taste information having a resemblance to the first taste information from a plurality of taste information of other users stored in predetermined storage means and representing the tastes of the other users; and a transmission step of transmitting at least attribute information of the other users that corresponds to the second taste information to the terminal apparatus of the user.

Further, in the present invention, an information reception method comprises: a transmission step of transmitting first taste information that represents the taste of a user to a predetermined apparatus that stores a plurality of taste information that represent respectively the tastes of a plurality of other users; and a reception step of receiving attribute information of the other users that corresponds to the second taste information, the attribute information being information that the predetermined apparatus that has received the first taste information at least transmits after searching for second taste information having a resemblance to the first taste information from the plurality of taste information stored therein.

With the above configuration, it is possible to introduce a group that is likely to match the taste of a given user based on the taste information of the given user transmitted from the terminal apparatus.

According to the present invention, it is possible to introduce a group that is likely to match the taste of a given user based on the taste information of the given user transmitted from the terminal apparatus. As a result, an information transmission apparatus, terminal apparatus, and methods thereof that allow a user to effectively receive introduction of a given group sharing the same taste with him or her.

BRIEF DESCRIPTION OF DRAWINGS

FIG. 9 is a view schematically showing a display screen (2).

FIG. 13 is a view schematically showing a display screen (4).

FIG. 14 is a view schematically showing a display screen (5).

FIG. 15 is a view schematically showing a display screen (6).

FIG. 17 is a view schematically showing a display screen (7).

BEST MODE FOR CARRYING OUT THE INVENTION

Figure 1:
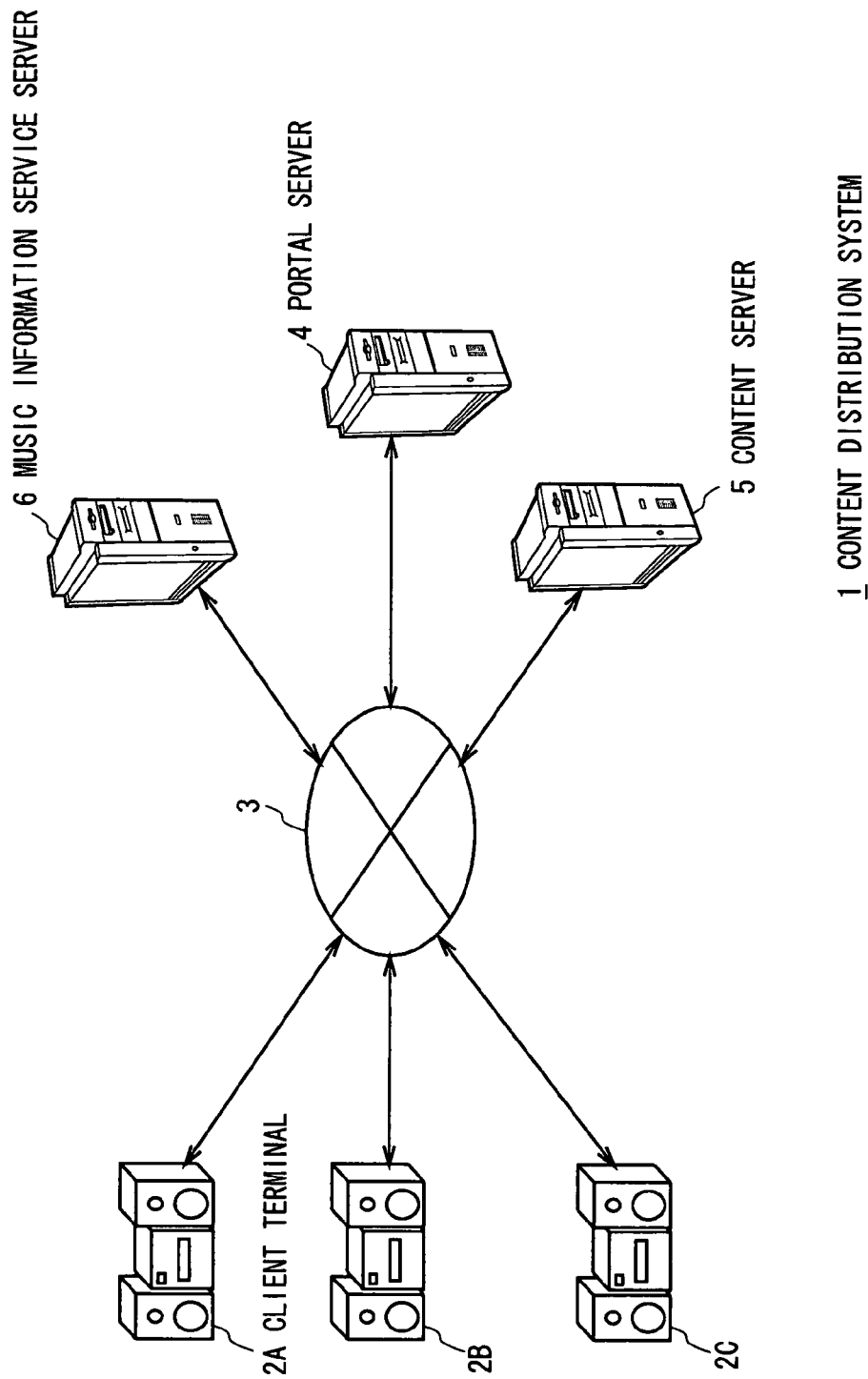
FIG. 1 is a view schematically showing the entire configuration of a content distribution system according to the present embodiments.

Embodiments of the present invention will be described in detail with reference to the accompanying drawings.
(1) First Embodiment
(1-1) Entire Configuration of Content Distribution System In FIG. 1, reference numeral 1 denotes a content distribution system as a whole. Client terminals 2A, 2B, 2C, . . . of respective users participating in the content distribution system 1 are connected, through a network 3, to a portal server 4 that manages the client terminals 2A, 2B, 2C . . . , a content server 5 that distributes various music data as content, and a music information service server 6 that provides various information related to music through a Web page as a medium.

For the sake of simplicity, it is assumed that the client terminal 2A is used by a user A, the client terminal 2B is used by a user B, and client terminal 2C is used by a user C in the present embodiment.

For example, in response to an operation by the user A, the client terminal 2A acquires various Web pages (hereinafter, referred to as "music information page") that contain music information from the music information service server 6 and displays the acquired music information pages on a display section.

Figure 2:
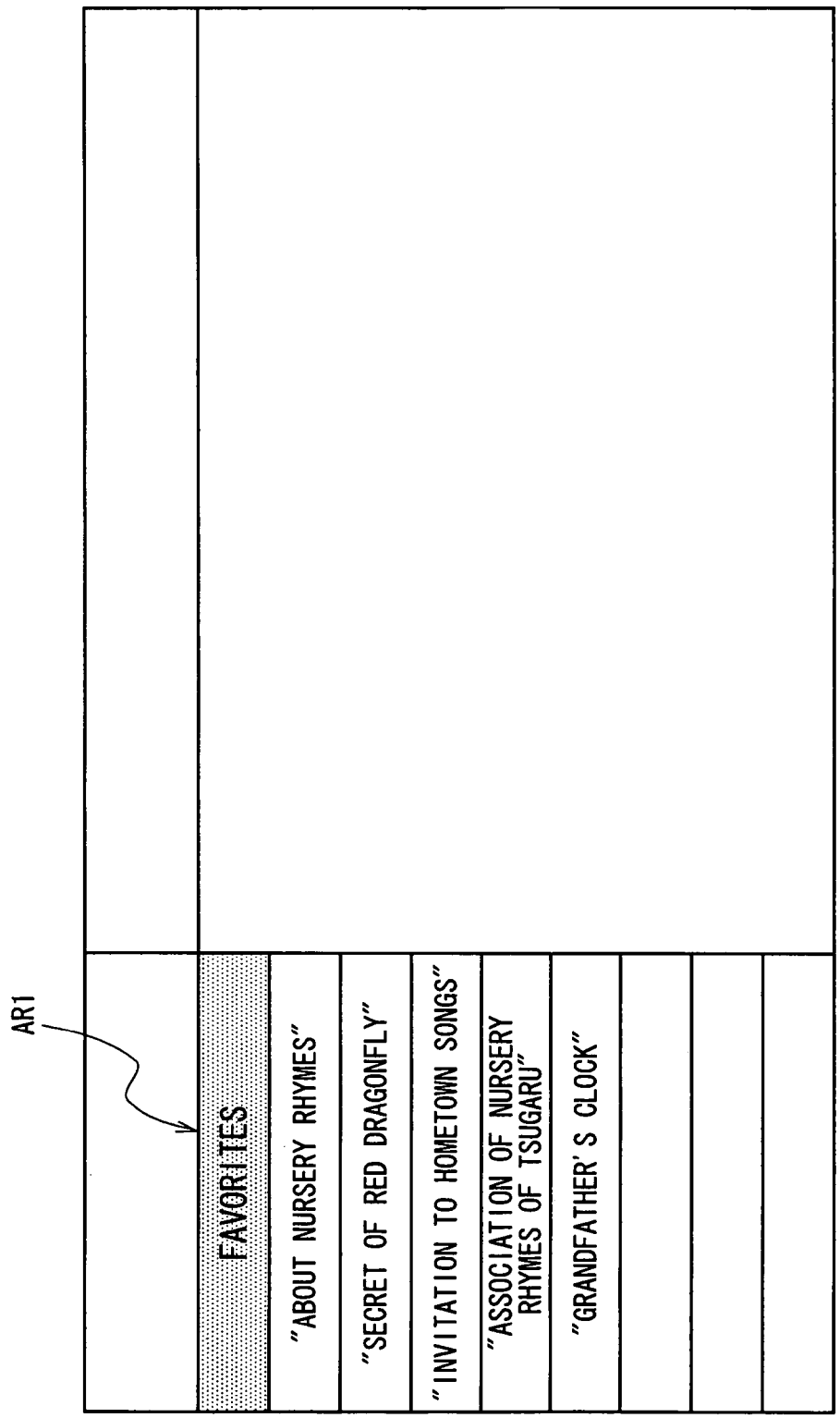
FIG. 2 is a view schematically showing a display screen (1).

Further, the client terminal 2A stores the page title of a user A's favorite music information page and its URL (Uniform Resource Locator) as taste information of the user A through a bookmark registration operation by the user A. The client terminal 2A then extracts only the page titles from among the stored taste information and displays them in a favorite display area AR1 of the display section, as shown in FIG. 2.

In this case, a page title "About nursery rhymes" and its corresponding URL, page title "Secret of Red Dragonfly" and its corresponding URL, page title "Invitation to hometown songs" and its corresponding URL, page title "Association of nursery rhymes of Tsugaru" and its corresponding URL, page title "Grandfather's Clock" and its corresponding URL are stored as the taste information of the user A.

As described above, it is possible for the user A of the client terminal 2A to browse his or her favorite music information page simply by selecting a page title in the favorite display area AR1 without inputting URL or the like.

On the other hand, in the portal server 4, many bulletin board page (so-called BBS (Bulletin Board System)) for users sharing the same music taste to exchange information are established. For example, in the portal server 4, various BBS pages such as "American rock group", "Japanese nursery rhymes group", "Irish folksongs-group", "African folksongs-group", "Film music group" . . . are established for each group consisting of persons sharing the same taste.

Figure 3:
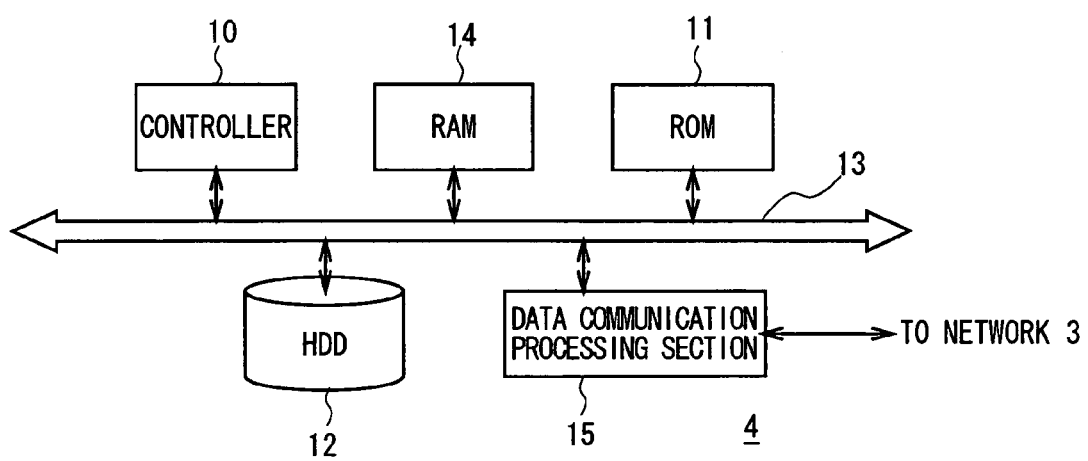
FIG. 3 is a block diagram showing a circuit configuration of a portal server.

As a result, the users of the content distribution system 1 can participate in an arbitrary group from many groups through the above BBS pages, thereby getting acquainted with other users having the same taste.
(1-2) Configuration of Portal Server The portal server 4 shown in FIG. 3 allows a controller 10 constituted by a CPU (Central Processing Unit) to appropriately loads a basic program and other various programs stored in a ROM (Read Only Memory) 11 or a hard disk drive 12 into a RAM (Random Access Memory) 14 through a bus 13 and execute them to thereby perform various processing.

Further, the controller 10 of the portal server 4 controls a data communication processing section 15 and thereby performs data communication with the portal server 4 and music information service server 6 through a network 3.

Figure 4:
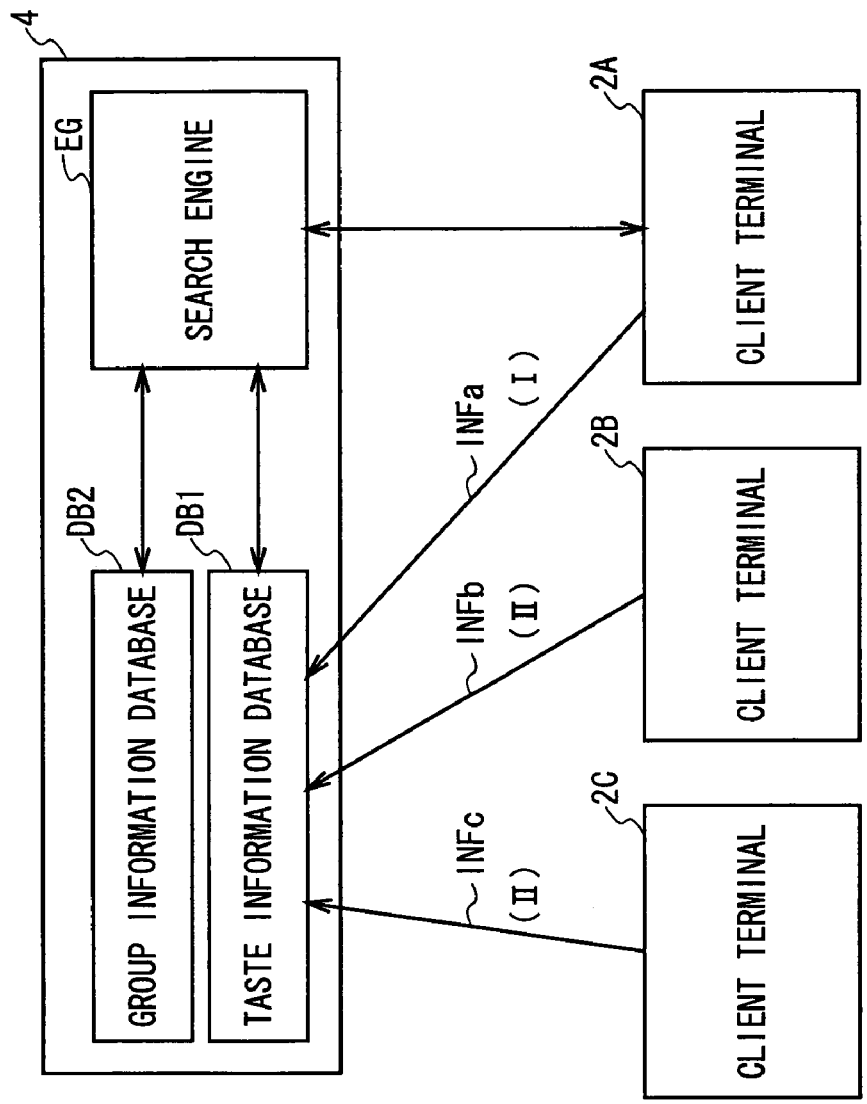
FIG. 4 is a view schematically showing databases built in the portal server.

The hard disk drive 12 stores sources and the like of the BBS pages established by respective groups. Further, a database is provided in this hard disk drive 12. The database is logically divided into two databases, as shown in FIG. 4: one is a taste information database DB1 for collecting the taste information of respective users participating in the content distribution system 1, and the other is a group information database DB2 for associating user IDs of the respective users with group name information of the groups that the respective users belong to.

Figure 5:
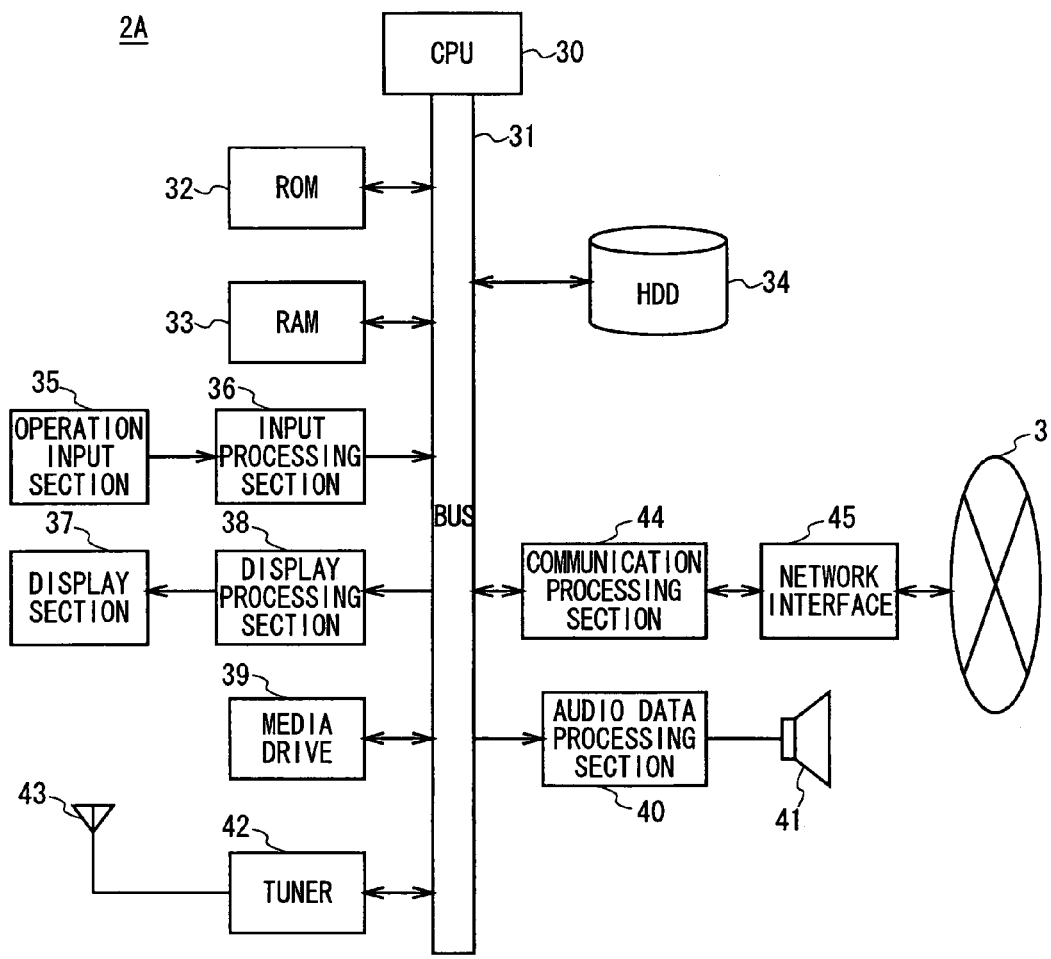
FIG. 5 is a view schematically showing a circuit configuration of a client terminal.

For example, in the group information database DB2, user ID "User B" of the user B is associated with group name information "Irish folksongs-group" of the group that the user B belongs to and stored, and user ID "User C" of the user C is associated with group name information "Japanese folksongs group" of the group that the user C belongs to and stored. In addition, user IDs of a large number of other users and other group name information are associated with each other and stored.
(1-3) Configuration of Client Terminal The client terminals 2A, 2B, 2C . . . have the same configuration and hence the client terminal 2A will be described as a representative.
(1-3-1) Circuit Configuration As shown in FIG. 5, a CPU 30 of the client terminal 2A reads out a basic program such as OS (Operating System) and various application programs from a ROM 32 connected thereto through a bus 31, loads them into a RAM 33 and, according to the programs, performs control of the entire apparatus and a predetermined calculation processing. For example, the CPU 30 performs communication operation through the network 3, processing corresponding to user's input/output operation, reproduction of content from media providers or writing of content downloaded from a radio station into a hard disk drive (HDD) 34 and controls thereof.

An operation input section 35 transmits, to an input processing section 36, input information corresponding to a user's operation to various operation keys and the like provided on the main body casing surface or a remote controller (not shown). The input processing section 36 performs predetermined processing to the input information and transmits it to the CPU 30 as an operation command, and the CPU 30 performs processing corresponding to the operation command.

A display section 37 may be a display device such as an LCD directly attached to the main body casing surface or an external display device. The display section 37 displays various information to be input through a display processing section 38.

A media drive 39 is, for example, a drive that reproduces a CD player and Memory Stick™ formed by flash memory elements. The media drive 39 digital/analog converts the reproduction result using an audio data processing section 40 and outputs the converted data from a 2 ch speaker 41.

In the case where the data reproduced by the media drive 39 is audio music content, the CPU 30 can store it in the hard disk drive 34 as audio data file.

Further, the CPU 30 can read out a plurality of still images that have been stored in Memory Stick™ by the media drive 39 and allow the display processing section 38 to display them on the display section 37 as a slide show.

Further, the CPU 30 can read out a plurality of songs stored in the hard disk drive 34 in random access mode and reproduce and output them in the user's desired order like a jukebox.

A tuner section 42 is, for example, an AM or FM tuner. Under the control of the CPU 30, the tuner section 42 receives a broadcast signal using an antenna 43, demodulates it, and outputs the demodulation result from the speaker 41 as broadcast voice data through the audio data processing section 40.

Under the control of the CPU 30, a communication processing section 44 performs encoding processing for transmission data and transmits the encoded data to an external network-enabled device through a network interface 45 and network 3, or performs decoding processing for the reception data that has been received from the external network-enabled device through the network interface 45 and transfers the decoded data to the CPU 30.

(1-3-2) Directory Management

Figure 6:
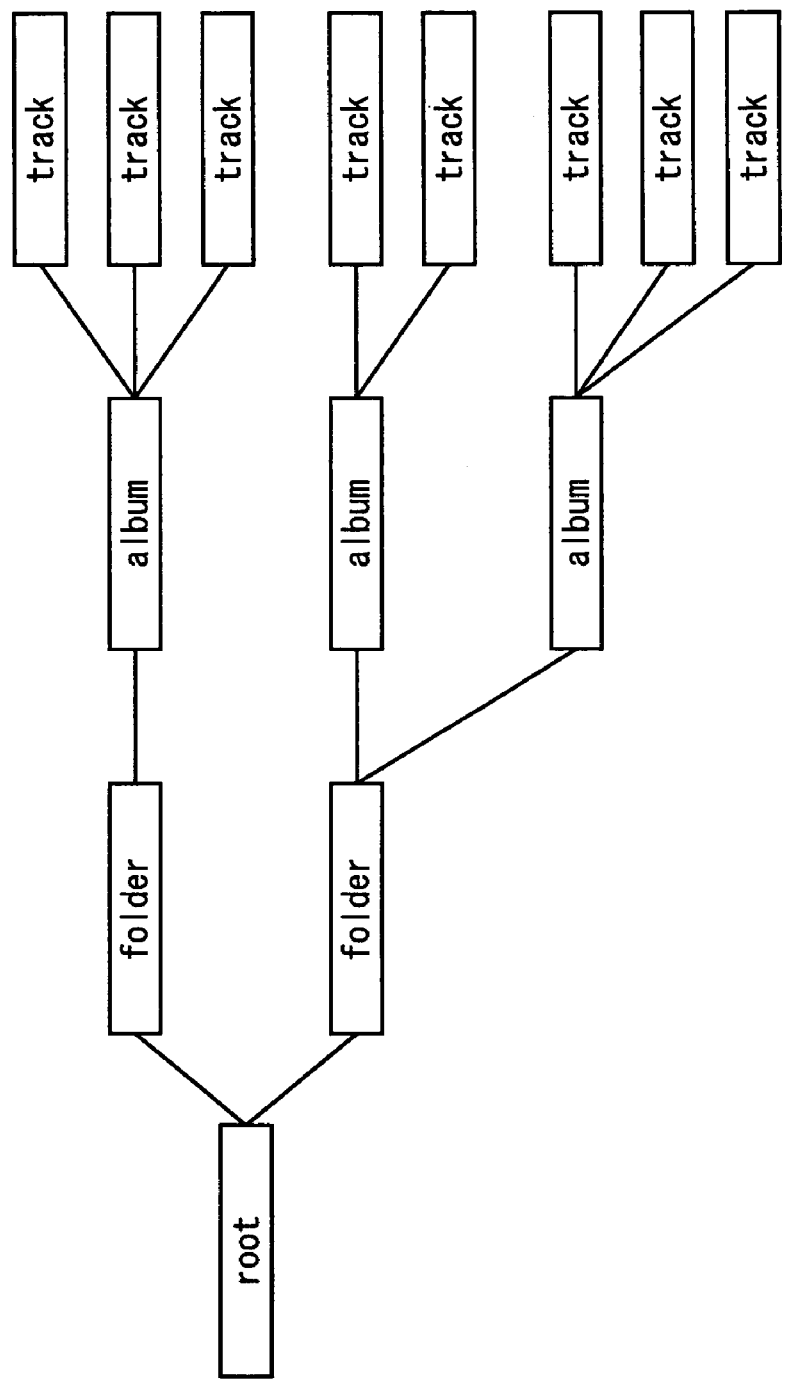
FIG. 6 is a view schematically showing a folder structure.

The CPU 30 of the client terminal 2A manages the contents stored in the hard disk drive 34 using the directory structure shown in FIG. 6. A given number of "folder" directories falling within a specified range are created under "root" directory. The "folder" directory corresponds, for example, to a category that content belongs to or an owner-user.

A given number of "album" directories falling within a specified range are created under the "folder" directories. The "album" directory corresponds, for example, to one album title. One or more "track" files are stored under each of the "album" directories. The "track" file corresponds to one song, i.e., one content.

The content management using the directory structure is performed by a database file stored in the hard disk drive 34.

(1-3-3) Program Module Configuration

Figure 7:
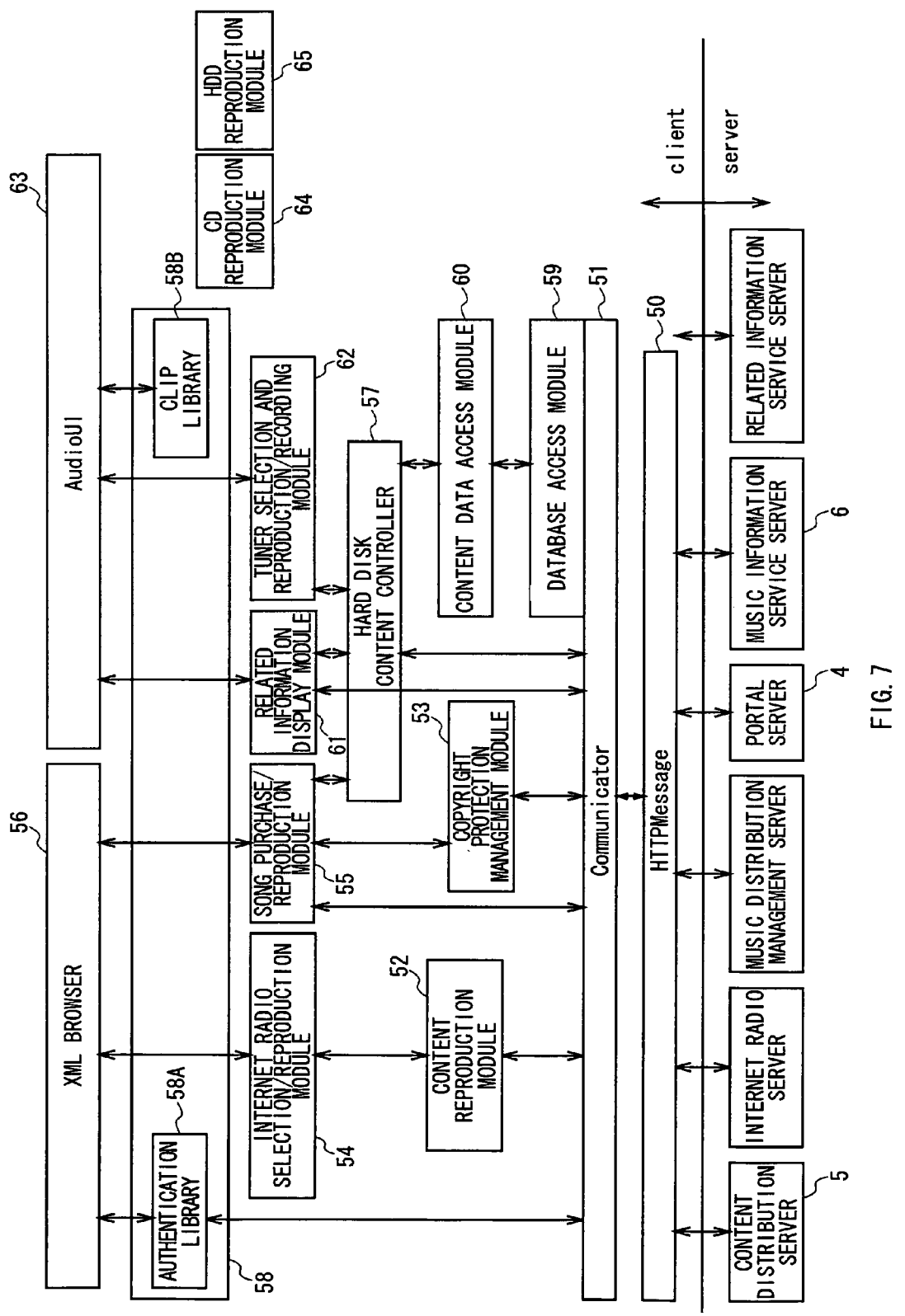
FIG. 7 is a view schematically showing program modules located in the client terminal.

As shown in FIG. 7, program modules of the client terminal 2A are configured to run on OS and communicate with the content distribution server 5, an internet radio server, a music distribution management server, the portal server 4, music information service server 6, and other various servers.

An HTTP (Hyper Text Transfer Protocol) message program 50 allows the program modules of the client terminal 2A to communicate with various servers such as the content distribution server 5, portal server 4, or music information service server 6 over HTTP communication. A communicator program 51 is a program module that exchanges data with the HTTP message program 50.

A content reproduction module 52 that interprets codec of the content to reproduce the content and a copyright protection information management module 53 that handles information related to copyright protection are located above the communicator program 51. An internet radio selection/reproduction module 54 that selects internet radio stations and reproduces content therefrom and a song purchase/reproduction module 55 that controls purchase of songs and reproduction thereof are located so as to correspond to the content reproduction module 52 and copyright protection information management module 53, respectively.

An XML (extensible Markup Language) browser 56 is located above the internet radio selection/reproduction module 54 and song purchase/reproduction module 55. The XML browser 56 interprets a source described in an XML or HTML (Hyper Text Markup Language) format and displays a Web page on the display section 37 based on the interpretation result.

The song that a user has selected on the XML browser 56 is purchased by the song purchase/reproduction module 55 and written into the hard disk drive 34 through a hard disk content controller 57.

An authentication library 58A of a library 58 is connected to the communicator program 51. The authentication library 58A performs user authentication processing between the client terminal 2A and portal server 4.

Further, a database access module 59, content data access module 60, and hard disk content controller 57 are located above the communicator program 51.

The database access module 59 accesses various databases built in the hard disk drive 34, the content data access module 60 accesses contents stored in the hard disk drive 34, and the hard disk content controller 57 manages contents stored in the hard disk drive 34.

A related information display module 61 for displaying the title and artist name of the song broadcasted by a radio station is located above the hard disk content controller 57. Further, a tuner selection and reproduction/recording module 62 that selects radio stations and records the content of the song received from the selected radio station in the hard disk drive 34 is located above the hard disk content controller 57.

For example, the song that has been received from the selected radio station through an audio user interface 63 is written into the hard disk drive 34 through the content data access module 60.

The related information display module 61 receives, as related information, the title and artist name of the song being broadcasted by a radio station selected by the tuner selection and reproduction/recording module 62 from a related information service server through the HTTP message program 50 and displays it on the display section 37 through an audio user interface (UI) 63.

The related information that has been displayed on the display section 37 through the audio user interface 63 can temporarily be stored in a clip library 58B of the library 58 and eventually be stored in the hard disk drive 34 through the database access module 59 according to a user's instruction.

The program module of the client terminal 2A further includes a CD reproduction module 64 for reproducing CD and an HDD reproduction module 65 for reproducing the hard disk drive 34, and the reproduction result thereof is output from the speaker 41 through the audio data processing section 40.

(1-4) Group Introduction Processing

Even if the user A wants to participate in some group that matches his or her taste, existence of a large number of groups in the content distribution system 1 makes it difficult for the user to select a desired group.

To cope with the above situation, the content distribution system 1 according the present embodiment performs group introduction processing. With this processing, it is possible to introduce, to the user A, a group corresponding to the taste of the user A. Here, a description is made of the group introduction processing with reference to the sequence chart shown in FIG. 8.

When recognizing predetermined registration operation performed by the user A, the CPU 30 of the client terminal 2A advances to step SP1 and transmits taste information INFa related to the user A to the portal server 4 as denoted by (I) in FIG. 4. Upon receiving the taste information INFa from the client terminal 2A, the controller 10 of the portal server 4 registers it in the taste information database DB1 in step SP2.

Further, as denoted by (II) in FIG. 4, taste information INFb, taste information INFc . . . related to the user B, user C, . . . have previously been transmitted to the portal server 4 from the client terminals 2B, 2C, . . . . Thus, the taste information INFb, taste information INFc . . . related to the user B, user C, . . . have already been registered in the taste information database DB1 of the portal server 4.

After that, when, for example, the use A selects "Association of nursery rhymes of Tsugaru" as a page title of his or her most favorite music information page from a plurality of page titles displayed in the favorite display area AR1 (FIG. 2) and requests the introduction of a group corresponding to the selected page title "Association of nursery rhymes of Tsugaru", the CPU 30 of the client terminal 2A advances to step SP3 and transmits URL corresponding to the selected page title "Association of nursery rhymes of Tsugaru" (that is, URL of the music information page "Association of nursery rhymes of Tsugaru") to the portal server 4 as search key information for searching for a group that matches the taste of the user A.

Upon receiving the search key information, i.e., URL of the music information page "Association of nursery rhymes of Tsugaru" from the client terminal 2A, the controller 10 of the portal server 4 advances to step SP4 and uses a search engine EG (FIG. 4) to search for the taste information including URL of "Association of nursery rhymes of Tsugaru" from taste information related to a plurality of users registered in the taste information database DB1.

After specifying, for example, the taste information INFc of the user C as the search result, the controller 10 of the portal server 4 advances to step SP5 and refers to the group information database DB2 through the search engine EG to thereby recognize the group name information "Japanese nursery rhymes group" of the group that the user C belongs to. The controller 10 of the portal server 4 then advances to step SP6 and transmits the recognized group name information "Japanese nursery rhymes group" to the client terminal 2A.

Upon receiving the group name information "Japanese nursery rhymes group" from the portal server 4, the CPU 30 of the client terminal 2A advances to step SP7 and displays the received group name information on the display section 37 (FIG. 9) to thereby introduce the "Japanese nursery rhymes group" to the user.

With the above configuration, the portal server 4 determines that the user C whose taste information INFc includes user A's favorite music information page "Association of nursery rhymes of Tsugaru" is a person having a similar taste to the user A and introduces, to the user A, the "Japanese nursery rhymes group" that the user C belongs to.

As a result, the user A can receive introduction of a group (in this case, "Japanese nursery rhymes group") that is likely to match his or her taste from among a large number of groups existing in the content distribution system 1 simply by selecting the page title (in this case, "Association of nursery rhymes of Tsugaru") displayed in the favorite display area AR1.

With the above configuration, it is possible to realize the content distribution system 1 that allows each user including the user A to effectively receive introduction of a given group sharing the same taste with the each user.

Figure 10:
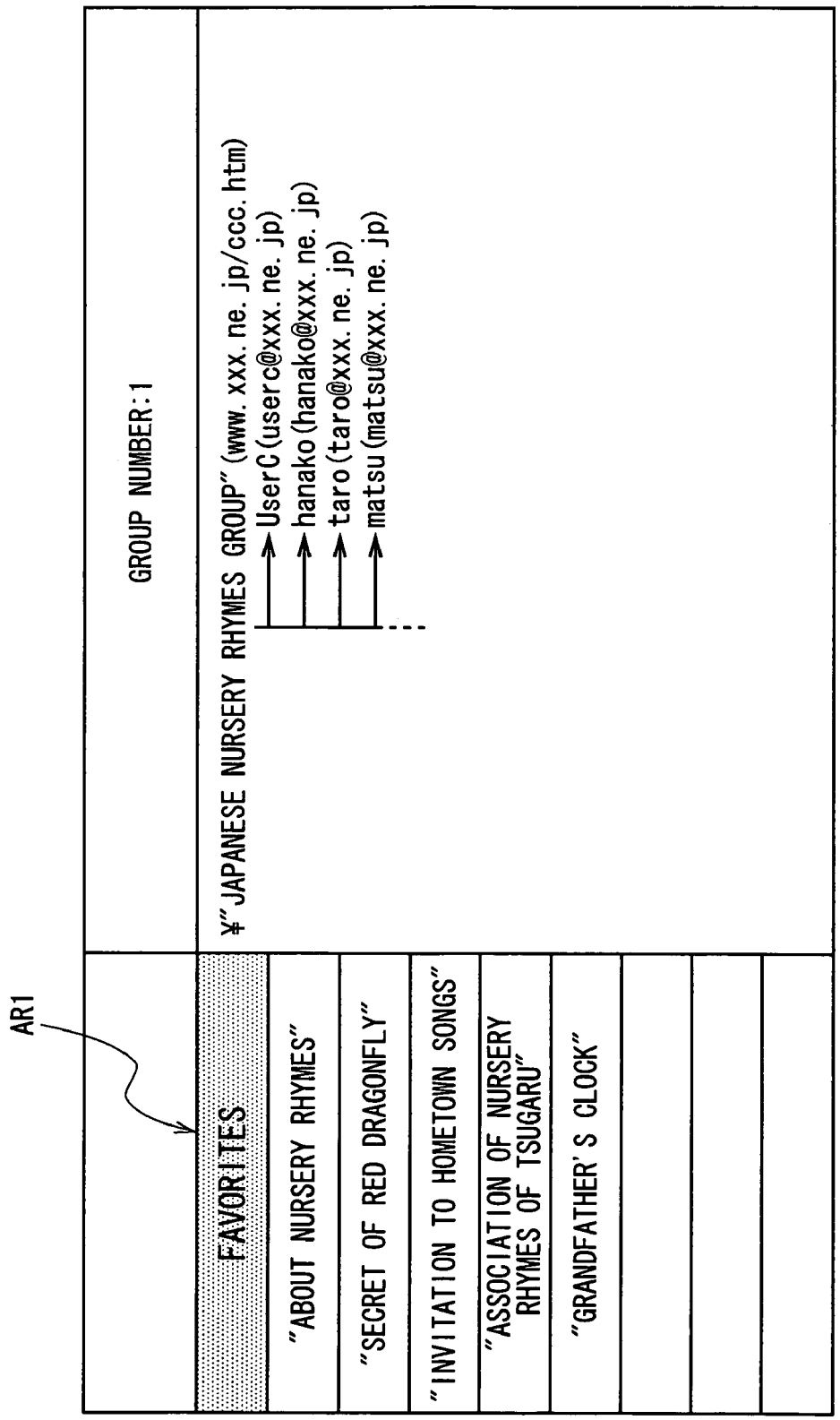
FIG. 10 is a view schematically showing a display screen (3).

In the above step SP7, only the group name information "Japanese nursery rhymes group" is displayed on the display section 37 of the client terminal 2A, as shown in FIG. 9. However, the present invention is by no means limited to this, and as shown in FIG. 10, addresses of the BBS pages established by the "Japanese folksongs group" and e-mail addresses of the members that belong to the "Japanese nursery rhymes group" may be displayed together with the group name information. This can further activate the exchange between users sharing the same taste.

In the above step SP3, the CPU 30 of the client terminal 2A allows the user A to select one page title ("Association of nursery rhymes of Tsugaru") and then transmits the URL of the selected title as search key information to the portal server 4. However, the present invention is by no means limited to this, and the CPU 30 of the client terminal 2A allows the user A to select two or more page titles and then transmits the URLs of the selected titles as search key information to the portal server 4.

(2) Second Embodiment

Figure 8:
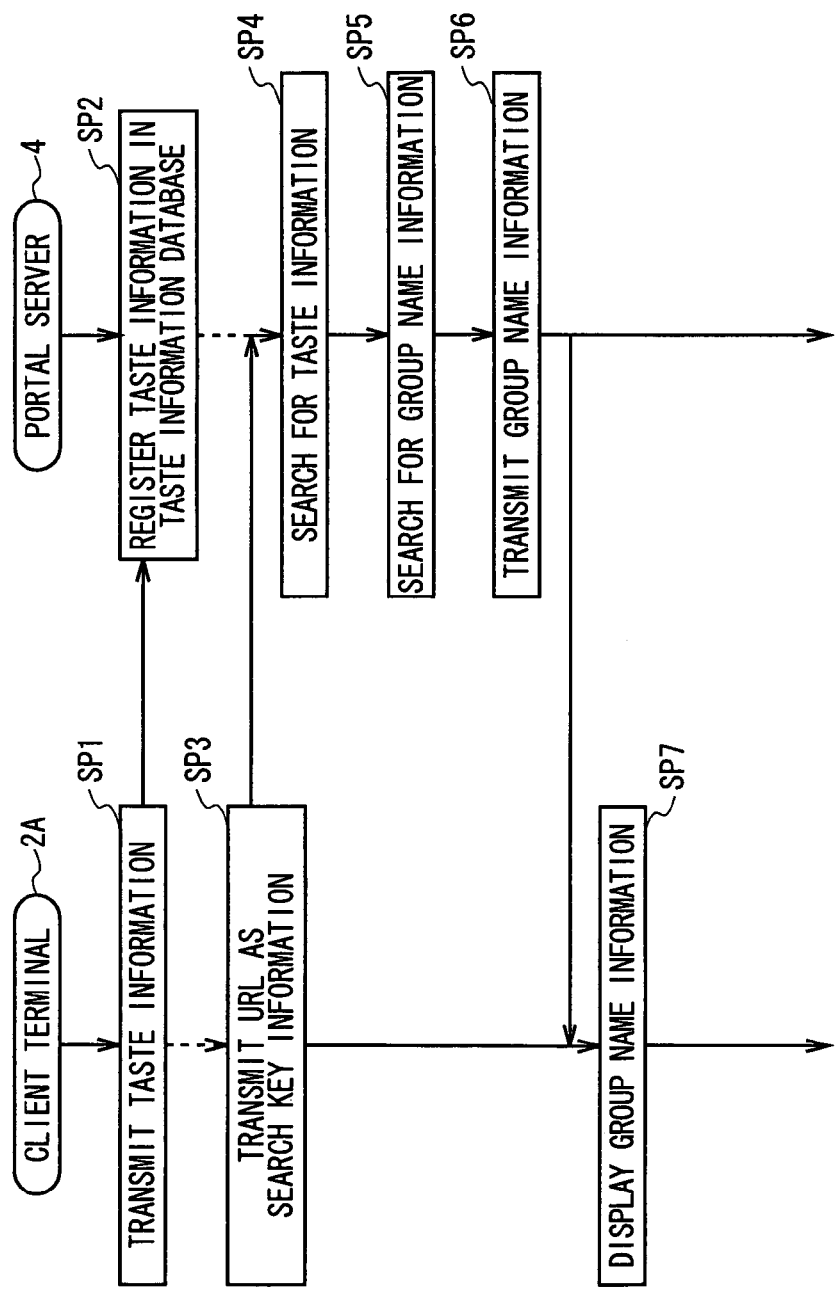
FIG. 8 is a sequence chart showing group introduction processing according to a first embodiment.

The entire configuration of the content distribution system 1 (FIG. 1), configuration of the portal server 4 (FIGS. 3 and 4), and configuration of the client terminal 2A (FIGS. 5 to 7) according to the second embodiment are the same as those of the first embodiment. A description will be made of only the group introduction processing, in which different procedure as that of the first embodiment is used, with reference to the sequence chart shown in FIG. 11 (the same reference numerals as FIG. 8 are given to the components which are common to FIG. 8).

(2-1) Group Introduction Processing

When recognizing predetermined registration operation performed by the user A, the CPU 30 of the client terminal 2A advances to step SP1 and transmits taste information INFa related to the user A to the portal server 4 as denoted by (I) in FIG. 4. Upon receiving the taste information INFa from the client terminal 2A, the controller 10 of the portal server 4 registers it in the taste information database DB1 in step SP2.

Further, as denoted by (II) in FIG. 4, taste information INFb, taste information INFc . . . related to the user B, user C, . . . have previously been transmitted to the portal server 4 from the client terminals 2B, 2C, . . . . Thus, the taste information INFb, taste information INFc . . . related to the user B, user C, . . . have already been registered in the taste information database DB1 of the portal server 4.

After that, when the user A requests the introduction of a group that matches his or her taste, the CPU 30 of the client terminal 2A advances to step SP10 and transmits the taste information INFa related to the user A to the portal server 4 as search key information for searching for a group that matches the taste of the user A.

Upon receiving the taste information INFa of the user A from the client terminal 2A as search key information, the controller 10 of the portal server 4 advances to step SP11 and refers to the taste information database DB1 through the search engine EG (FIG. 4) to thereby search for the taste information of other users that include all URLs included in the taste information INFa of the user A.

After specifying, for example, the taste information INFc of the user C as the search result, the controller 10 of the portal server 4 determines that the taste information INFc of the user C is similar to the taste information INFa of the user A. The controller 10 then advances to step SP12 and refers to the group information database DB2 through the search engine EG to thereby recognize the group name information "Japanese nursery rhymes group" of the group that the user C belongs to. The controller 10 of the portal server 4 then advances to step SP13 and transmits the recognized group name information "Japanese nursery rhymes group" to the client terminal 2A.

Upon receiving the group name information "Japanese nursery rhymes group" from the portal server 4, the CPU 30 of the client terminal 2A advances to step SP14 and displays the received group name information on the display section 37 (FIG. 9) to thereby introduce the "Japanese nursery rhymes group" to the user A.

With the above configuration, the portal server 4 determines that the user C whose taste information INCc includes URLs corresponding to all the music information pages that the user A is interested in is a person having a similar taste to the user A and introduces, to the user A, the "Japanese nursery rhymes group" that the user C belongs to.

As a result, the user A can receive introduction of a group (in this case, "Japanese nursery rhymes group") that is likely to match his or her taste simply by requesting the introduction of a group that matches his or her taste.

With the above configuration, it is possible to realize the content distribution system 1 that allows each user including the user A to effectively receive introduction of a given group sharing the same taste with the each user.

(3) Third Embodiment

Figure 12:
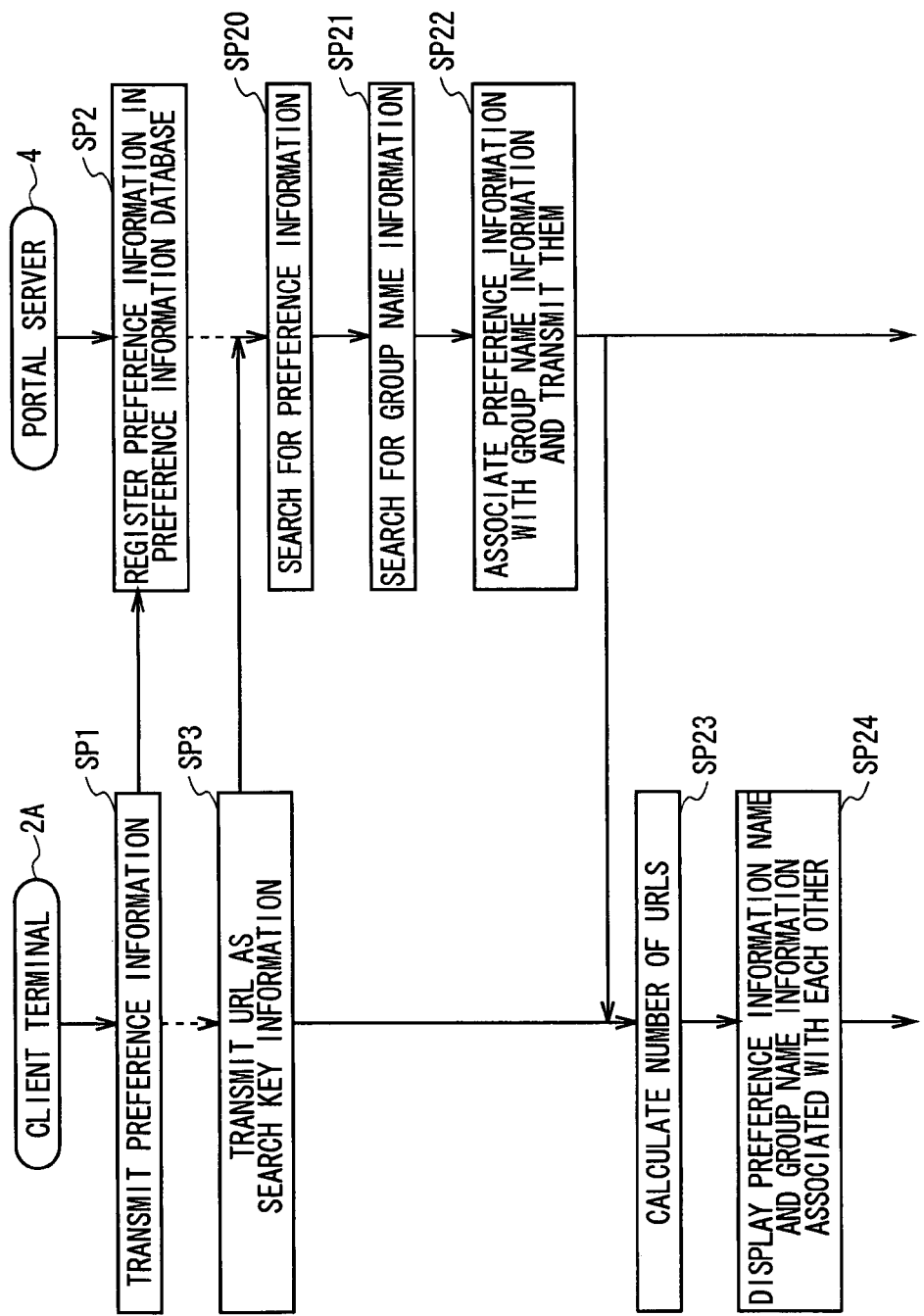
FIG. 12 is a sequence chart showing group introduction processing according to a third embodiment.

The entire configuration of the content distribution system 1 (FIG. 1), configuration of the portal server 4 (FIGS. 3 and 4), and configuration of the client terminal 2A (FIGS. 5 to 7) according to the third embodiment are the same as those of the first and second embodiments. A description will be made of only the group introduction processing, in which different procedure as those of the first and second embodiments is used, with reference to the sequence chart shown in FIG. 12 (the same reference numerals as FIG. 8 are given to the components which are common to FIG. 8).

(3-1) Group Introduction Processing

When recognizing predetermined registration operation performed by the user A, the CPU 30 of the client terminal 2A advances to step SP1 and transmits taste information INFa related to the user A to the portal server 4 as denoted by (I) in FIG. 4. Upon receiving the taste information INFa from the client terminal 2A, the controller 10 of the portal server 4 registers it in the taste information database DB1 in step SP2.

Further, as denoted by (II) in FIG. 4, taste information INFb, taste information INFc . . . related to the user B, user C, . . . have previously been transmitted to the portal server 4 from the client terminals 2B, 2C, . . . . Thus, the taste information INFb, taste information INFc . . . related to the user B, user C, . . . have already been registered in the taste information database DB1 of the portal server 4.

After that, when, for example, the use A selects "Association of nursery rhymes of Tsugaru" as a page title of his or her most favorite music information page from a plurality of page titles displayed in the favorite display area AR1 (FIG. 2) and requests the introduction of a group corresponding to the selected page title "Association of nursery rhymes of Tsugaru", the CPU 30 of the client terminal 2A advances to step SP3 and transmits URL corresponding to the selected page title "Association of nursery rhymes of Tsugaru" (that is, URL of the music information page "Association of nursery rhymes of Tsugaru") to the portal server 4 as search key information for searching for a group that matches the taste of the user A.

Upon receiving the search key information, i.e., URL of the music information page "Association of nursery rhymes of Tsugaru" from the client terminal 2A, the controller 10 of the portal server 4 advances to step SP20 and uses a search engine EG (FIG. 4) to search for all taste information that include URL of "Association of nursery rhymes of Tsugaru" from taste information related to a plurality of users registered in the taste information database DB1.

After specifying, for example, the taste information INFc, . . . of the plurality of users including the user C as the search result, the controller 10 of the portal server 4 advances to step SP21 and refers to the group information database DB2 through the search engine EG to thereby recognize the group name information "Japanese nursery rhymes group", "Nursery rhymes of the World group", . . . of the groups that the plurality of users including the user C belong to.

The controller 10 of the portal server 4 then advances to step SP22 and associates the specified taste information INFc, . . . of the plurality of users with the recognized group name information "Japanese nursery rhymes group", "Nursery rhymes of the World group", . . . and transmits the associated information to the client terminal 2A.

Upon receiving the taste information INFc, . . . of the plurality of users including the user C and group name information "Japanese nursery rhymes group", "Nursery rhymes of the World group", . . . of the groups that the plurality of users belong to from the portal server 4, the CPU 30 of the client terminal 2A advances to step SP23 and calculates how much the URLs included in the taste information INFa of the user A are included in each of the taste information INFc, . . . of the plurality of users.

The CPU 30 of the client terminal 2A then advances to step SP24 and, as shown in FIG. 13, associates respective taste information name "Taste information of User C", "Taste information of hanako", . . . of the taste information INFc, . . . of the plurality of users with the group name information "Japanese nursery rhymes group", "Nursery rhymes of the World group", . . . of the groups that the plurality of users belong to so as to display them on the display section 37.

Incidentally, in step SP24, the more the taste information of a given user includes URLs corresponding to those included in the taste information INFa of the user A, the higher the position of taste information name corresponding to the taste information of the given user displayed on the display section 37.

Thus, the user A can easily specify the group name information "Japanese nursery rhymes group" that the user C belongs to, which is most likely to match his or her taste.

With the above configuration, the portal server 4 determines that the user C, . . . whose taste information INFc, . . . include user A's favorite music information page "Association of nursery rhymes of Tsugaru" are persons each having a similar taste to the user A and introduces, to the user A, the "Japanese nursery rhymes group", . . . that the user C, . . . belong to.

As a result, the user A can receive introduction of a group that is likely to match his or her taste from among a large number of groups existing in the content distribution system 1 simply by selecting the page title (in this case, "Association of nursery rhymes of Tsugaru") displayed in the favorite display area AR1.

With the above configuration, it is possible to realize the content distribution system 1 that allows each user including the user A to effectively receive introduction of a given group sharing the same taste with the each user.

When, for example, the user A selects the taste information name "Taste information of User C" from among a plurality of taste information names displayed on the display section 37 as shown in FIG. 13, the CPU 30 of the client terminal 2A correspondingly displays all page titles such as "Invitation to hometown songs", . . . included in the taste information INFc of the user C, as shown in FIG. 14.

With the above configuration, the user A can grasp all the music information pages that the user C who is likely to have the same taste as him or her is interested in and thereby easily finds out the music information pages that he or she is likely to be interested in.

When the user A selects, for example, the page title "Acorn song" in a state where the page titles "Invitation to hometown songs", . . . included in the taste information INFc are displayed on the display section 37, the CPU 30 of the client terminal 2A adds the selected page title "Acorn song" and its URL to the taste information INFa of the user A and displays the page title "Acorn song" to the favorite display area AR1, as shown in FIG. 15. As described above, the user A of the client terminal 2A can easily bookmark a new music information page based on the taste information INFc of the user C.

Although, in the above step SP24, respective taste information names "Taste information of User C", "Taste information of hanako", . . . of the taste information INFc, . . . of a plurality of users are displayed on the display section 37 of the client terminal 2A without change, the user ID included in the taste information name may be hidden. For example, in place of the taste information names "Taste information of User C", "Taste information of hanako", . . . , taste information names that the client terminal 2A has appropriately generated, such as "Taste information #1", "Taste information #2", . . . may be displayed.

(4) Fourth Embodiment

Figure 11:
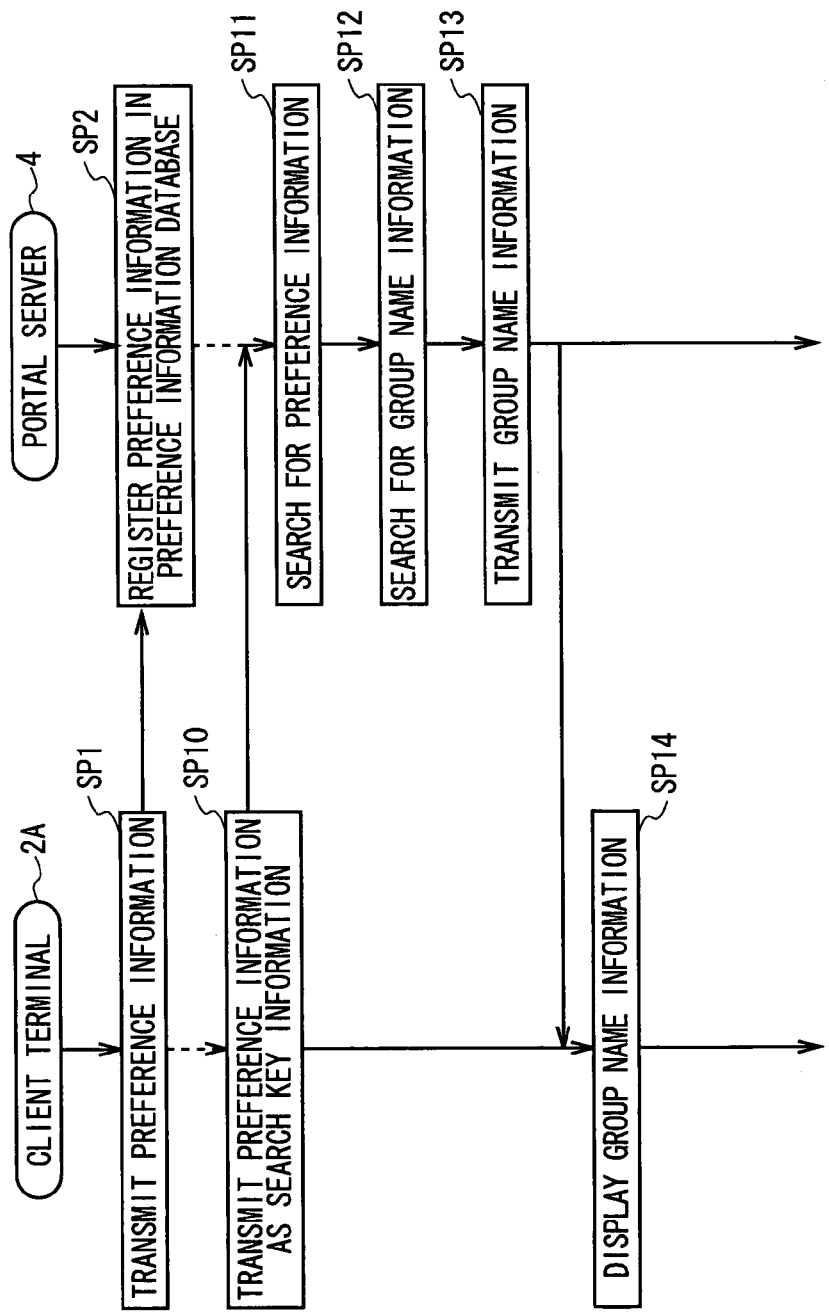
FIG. 11 is a sequence chart showing group introduction processing according to a second embodiment.
Figure 16:
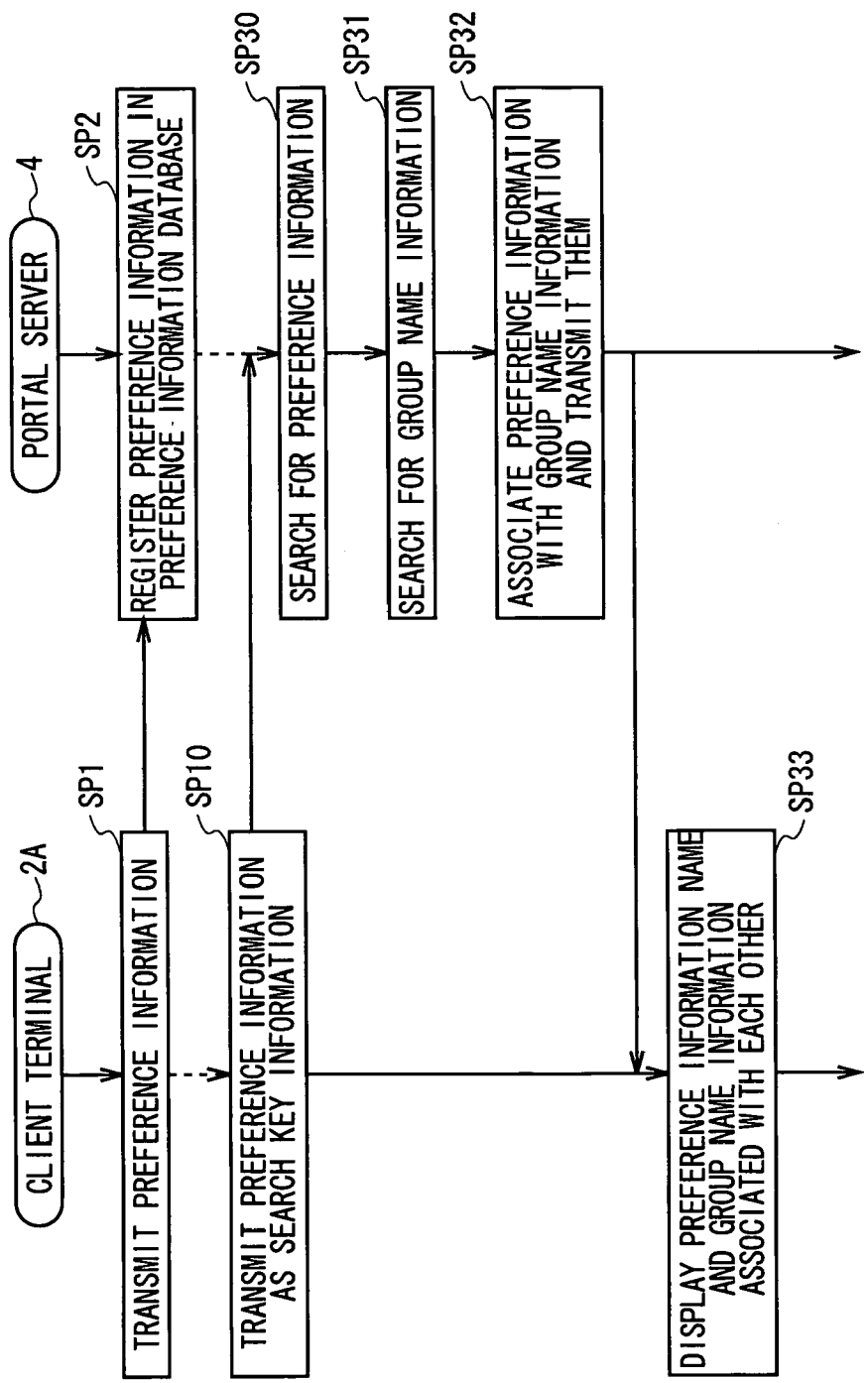
FIG. 16 is a sequence chart showing group introduction processing according to a fourth embodiment.

The entire configuration of the content distribution system 1 (FIG. 1), configuration of the portal server 4 (FIGS. 3 and 4), and configuration of the client terminal (FIGS. 5 to 7) according to the fourth embodiment are the same as those of the first to third embodiments. A description will be made of only the group introduction processing, in which different procedure as those of the first to third embodiments is used, with reference to the sequence chart shown in FIG. 16 (the same reference numerals as FIG. 11 are given to the components which are common to FIG. 11).

(4-1) Group Introduction Processing

When recognizing predetermined registration operation performed by the user A, the CPU 30 of the client terminal 2A advances to step SP1 and transmits taste information INFa related to the user A to the portal server 4 as denoted by (I) in FIG. 4. Upon receiving the taste information INFa from the client terminal 2A, the controller 10 of the portal server 4 registers it in the taste information database DB1 in step SP2.

Further, as denoted by (II) in FIG. 4, taste information INFb, taste information INFc . . . related to the user B, user C, . . . have previously been transmitted to the portal server 4 from the client terminals 2B, 2C, . . . . Thus, the taste information INFb, taste information INFc . . . related to the user B, user C, . . . have already been registered in the taste information database DB1 of the portal server 4.

After that, when the use A requests the introduction of a group that matches his or her taste, the CPU 30 of the client terminal 2A advances to step SP10 and transmits the taste information INFa related to the user A to the portal server 4 as search key information for searching for a group that matches the taste of the user A.

Upon receiving the taste information INFa of the user A from the client terminal 2A as search key information, the controller 10 of the portal server 4 advances to step SP30 and refers to the taste information database DB1 through the search engine EG (FIG. 4) to thereby search for the taste information of other users that include all URLs included in the taste information INFa of the user A.

After specifying, for example, the taste information INFc, . . . of a plurality of users including the user C as the search result, the controller 10 of the portal server 4 advances to step SP31 and refers to the group information database DB2 through the search engine EG to thereby recognize the group name information "Japanese nursery rhymes group", . . . that the plurality of users including the user C belong to.

The controller 10 of the portal server 4 then advances to step SP32 and associates the specified taste information INFc, . . . of the plurality of users with the recognized group name information "Japanese nursery rhymes group", . . . and transmits the associated information to the client terminal 2A.

Upon receiving the taste information INFc, . . . of the plurality of users including the user C and group name information "Japanese nursery rhymes group", . . . of the groups that the plurality of users belong to from the portal server 4, the CPU 30 of the client terminal 2A advances to step SP33 and associates respective taste information name "Taste information of User C" . . . of the taste information INFc, . . . of the plurality of users with the group name information "Japanese nursery rhymes group", . . . of the groups that the plurality of users belong to so as to display them on the display section 37, as shown in FIG. 17.

With the above configuration, the portal server 4 determines that the user C, . . . whose taste information INFc, . . . include URLs corresponding to all the music information pages that the user A is interested in are persons each having a similar taste to the user A and introduces, to the user A, the "Japanese nursery rhymes group", . . . that the user C, . . . belong to.

As a result, the user A can receive introduction of a group that is likely to match his or her taste simply by requesting the introduction of a group that matches his or her taste.

With the above configuration, it is possible to realize the content distribution system 1 that allows each user including the user A to effectively receive introduction of a given group sharing the same taste with the each user.

(5) Another Embodiment

Although the client terminal 2A having a music reproduction function is used as a terminal apparatus in the above first to fourth embodiments, other various information processing apparatuses such as a personal computer or mobile phone can be used in the present invention.

Further, although the group consisting of users having the same taste in music is taken as an example in the first to fourth embodiments, the group may consist of users having the same taste in other various categories such as film or game. In this case, in place of URL of the music information page, URL of a film information page (Web page), film title, or game title is used as the search key information (or taste information) that the client terminal 2A transmits, and thereby the same advantage as that of the above embodiments can be obtained.

Further, although the controller 10 of the portal server 4 is used as a search means for searching for second taste information including the search key information from a plurality of taste information stored in a storage means (hard disk drive 12) in the first to fourth embodiments, the present invention is not limited this and other various configurations may be used.

Further, although the communication processing section 15 of the portal server 4 is used as a transmission means for transmitting the second taste information in the first to fourth embodiments, the present invention is not limited this and other various configurations may be used.

Further, although the communication processing section 44 and network interface 45 of the client terminal 2A are used as a transmission means for transmitting first taste information representing a user's taste to a predetermined apparatus (portal server 4) that stores a plurality of taste information representing tastes of other plurality of users and a reception means for receiving the second taste information in the first to fourth embodiments, the present invention is not limited this and other various configurations may be used.

Further, although the client terminal 2A and portal server 4 control respective circuit sections according to programs that have respectively been installed thereon to thereby perform the above group introduction processing in a software manner in the first to fourth embodiments, the present invention is not limited to this and a circuit for realizing the group introduction processing may respectively be provided in the client terminal 2A and portal server 4 to allow the group introduction processing to be performed in a hardware manner.

Further, although the taste information including the search key information (URL) received from, for example, the client terminal 2A is used as the second taste information having a resemblance to the first taste information in the first to fourth embodiments, the present invention is not limited to this. For example, taste information having URL of a Web page related to the same category as that of the Web page corresponding to the search key information (URL) may be used.

Further, in the first to fourth embodiments, although the information (group name information) of the group that the user C, who is likely to have the same taste as the user A, belongs to is used as the attribute information of other users, the present invention is not limited to this and profile information of the user C and the like may be used.

Industrial Applicability

The present invention can be applied to a system in which a plurality of users have been registered.

DESCRIPTION OF SYMBOLS

1 . . . CONTENT DISTRIBUTION SYSTEM 2A . . . CLIENT TERMINAL 4 . . . PORTAL SERVER 10 . . . CONTROLLER 12 . . . HARD DISK DRIVE 15 . . . DATA COMMUNICATION PROCESSING SECTION 30 . . . CPU 44 . . . COMMUNICATION PROCESSING SECTION 45 . . . NETWORK INTERFACE

The invention claimed is:

1. An information transmission apparatus, comprising:
reception means for receiving a plurality of taste information that represent respective tastes of a plurality of users from a plurality of terminal apparatuses of the plurality of users;
storage means for storing the received plurality of taste information and group information in association with the plurality of users;
search means for receiving, from a first user, an introduction request including search key information that is a subset of taste information of the first user, the search key information being selected by the first user concurrently with generating the introduction request, and searching for a second user associated with taste information having a resemblance to the search key information from the plurality of taste information stored in association with the plurality of users in the storage means;
retrieval means for retrieving at least taste information or group information associated with the second user for introduction to the first user, the retrieved taste information or group information not being associated with the first user; and
transmission means for transmitting the retrieved taste information or group information associated with the second user to a terminal apparatus corresponding to the first user,
wherein the plurality of taste information includes page titles for music information pages and corresponding uniform resource locators (URLs) for the music information pages, the music information pages being selected by each of the plurality of users, and
wherein an overlap between the taste information of the first user and each of the plurality of taste information is determined and each of the plurality of taste information is displayed ordered in accordance with the determined overlap.

2. The information transmission apparatus according to claim 1, wherein
the retrieval means retrieves the group information associated with the second user for introduction to the first user, the group information not being associated with the first user and identifying an interest group to which the second user belongs; and
the transmission means transmits the retrieved group information associated with the second user to the terminal apparatus corresponding to the first user.

3. The information transmission apparatus according to claim 1, wherein the search key information is not the same as the taste information having the resemblance to the search key information.

4. The information transmission apparatus according to claim 3,
wherein a subject matter of the search key information is similar to a subject matter of the taste information having the resemblance to the search key information.

5. The information transmission apparatus according to claim 1, wherein at least one URL corresponding to the subset of taste information of the first user and the search key information is not the same as at least one URL corresponding to the taste information associated with the second user.

6. An information transmission method of an information transmission apparatus, comprising:
receiving a plurality of taste information that represent respective tastes of a plurality of users from a plurality of terminal apparatuses of the plurality of users;
storing, in a predetermined storage unit, the received plurality of taste information and group information in association with the plurality of users;
receiving, by the information transmission apparatus, an introduction request, from a first user, the introduction request including search key information that is a subset of taste information of the first user, the search key information being selected by the first user concurrently with generating the introduction request;
searching, by the information transmission apparatus, for a second user associated with taste information having a resemblance to the search key information from the plurality of taste information stored in association with the plurality of users in the predetermined storage unit;
retrieving taste information or group information associated with the second user for introduction to the first user, the retrieved taste information or group information not being associated with the first user;
transmitting, by the information transmission apparatus, at least the retrieved taste information or group information associated with the second user to a terminal apparatus corresponding to the first user;
determining an overlap between the taste information of the first user and each of the plurality of taste information; and
displaying each of the plurality of taste information ordered in accordance with the determined overlap,
wherein the plurality of taste information includes page titles for music information pages and corresponding uniform resource locators (URLs) for the music information pages, the music information pages being selected by each of the plurality of users.

7. The information transmission method according to claim 6, wherein
the transmitting step transmits at least the group information that represents groups that the plurality of users belong to and that is associated with the second user to the terminal apparatus of the first user.

8. The information transmission method according to claim 6, wherein
the receiving the introduction request step receives a part of the plurality of taste information as the search key information;
the searching step searches for taste information including the search key information from the plurality of taste information of the plurality of users stored in the predetermined storage unit to identify the second user; and
the transmitting step transmits at least the group information that represents groups that the plurality of users belong to and that is associated with the second user to the terminal apparatus of the first user.

9. The information transmission method according to claim 6, wherein
the transmitting step transmits at least the taste information of the second user and the group information that represents groups that the plurality of users belong to and that is associated with the second user to the terminal apparatus of the first user.

10. The information transmission method according to claim 6, wherein
the receiving the introduction request step receives a part of the plurality of taste information as the search key information;
the searching step searches for taste information including the search key information from the plurality of taste information of the plurality of users stored in the predetermined storage unit to identify the second user; and
the transmitting step transmits at least the taste information of the second user and the group information that represents groups that the plurality of users belong to and that is associated with the second user to the terminal apparatus of the first user.

11. The information transmission method according to claim 6, wherein
the retrieving step retrieves the group information associated with the second user for introduction to the first user, the group information not being associated with the first user and identifying an interest group to which the second user belongs; and
the transmitting step transmits the retrieved group information associated with the second user to the terminal apparatus corresponding to the first user.

12. An information transmission apparatus, comprising:
a reception unit configured to receive a plurality of taste information that represent respective tastes of a plurality of users from a plurality of terminal apparatuses of the plurality of users;
a storage unit configured to store the received plurality of taste information and group information in association with the plurality of users;
a search unit configured to receive, from a first user, an introduction request including search key information that is a subset of taste information of the first user, the search key information being selected by the first user concurrently with generating the introduction request, and to search for a second user associated with taste information having a resemblance to the search key information from the plurality of taste information stored in association with the plurality of users in the storage unit;
a retrieval unit configured to retrieve at least taste information or group information associated with the second user for introduction to the first user, the retrieved taste information or group information not being associated with the first user; and
a transmission unit configured to transmit the retrieved taste information or group information associated with the second user to a terminal apparatus corresponding to the first user,
wherein the plurality of taste information includes page titles for music information pages and corresponding uniform resource locators (URLs) for the music information pages, the music information pages being selected by each of the plurality of users, and
wherein an overlap between the taste information of the first user and each of the plurality of taste information is determined and each of the plurality of taste information is displayed ordered in accordance with the determined overlap.

13. The information transmission apparatus according to claim 12, wherein
the transmission unit is configured to transmit at least the group information that represents groups that the plurality of users belong to and that is associated with the second user to the terminal apparatus of the first user.

14. The information transmission apparatus according to claim 12, wherein
the search unit is configured to receive a part of the plurality of taste information as the search key information;
the search unit is configured to search for taste information including the search key information from the plurality of taste information stored in the storage unit to identify the second user; and
the transmission unit is configured to transmit at least the group information that represents groups that the plurality of users belong to and that is associated with the second user to the terminal apparatus of the first user.

15. The information transmission apparatus according to claim 12, wherein
the transmission unit is configured to transmit at least the taste information of the second user and the group information that represents groups that the plurality of users belong to and that is associated with the second user to the terminal apparatus of the first user.

16. The information transmission apparatus according to claim 12, wherein
the search unit is configured to receive a part of the plurality of taste information as the search key information;
the search unit is configured to search for taste information including the search key information from the plurality of taste information stored in the storage unit to identify the second user; and
the transmission unit is configured to transmit at least the taste information of the second user and the group information that represents groups that the plurality of users belong to and that is associated with the second user to the terminal apparatus of the first user.

17. The information transmission apparatus according to claim 12, wherein
the retrieval unit is configured to retrieve the group information associated with the second user for introduction to the first user, the group information not being associated with the first user and identifying an interest group to which the second user belongs; and the transmission unit is configured to transmit the retrieved group information associated with the second user to the terminal apparatus corresponding to the first user.

18. A non-transitory computer-readable storage medium having embedded therein instructions, which when executed by a processor, cause the processor to perform a method, comprising:

receiving a plurality of taste information that represent respective tastes of a plurality of users from a plurality of terminal apparatuses of the plurality of users;

storing the received plurality of taste information and group information in association with the plurality of users;

receiving, from a first user, an introduction request including search key information that is a subset of taste information of the first user, the search key information being selected by the first user concurrently with generating the introduction request;

searching for a second user associated with taste information having a resemblance to the search key information from the plurality of taste information stored in association with the plurality of users in the storing step;

retrieving at least taste information or group information associated with the second user for introduction to the first user, the retrieved taste information or group information not being associated with the first user;

transmitting the retrieved taste information or group information to a terminal apparatus corresponding to the first user;

determining an overlap between the taste information of the first user and each of the plurality of taste information; and displaying each of the plurality of taste information ordered in accordance with the determined overlap, wherein the plurality of taste information includes page titles for music information pages and corresponding uniform resource locators (URLs) for the music information pages, the music information pages being selected by each of the plurality of users.

19. The non-transitory computer-readable storage medium according to claim 18, wherein the retrieving step retrieves the group information associated with the second user for introduction to the first user, the group information not being associated with the first user and identifying an interest group to which the second user belongs; and the transmitting step transmits the retrieved group information associated with the second user to the terminal apparatus corresponding to the first user.

20. An information transmission apparatus, comprising:

reception means for receiving a plurality of taste information that represent respective tastes of a plurality of users from a plurality of terminal apparatuses of the plurality of users;

storage means for storing the received plurality of taste information and group information in association with the plurality of users;

search means for receiving, from a first user, an introduction request including search key information that is a subset of taste information of the first user, the search key information being selected by the first user concurrently with generating the introduction request, and searching for a second user associated with taste information having a resemblance to the search key information from the plurality of taste information stored in association with the plurality of users in the storage means; and transmission means for transmitting at least taste information or group information associated with the second user, for introduction to the first user, to a terminal apparatus corresponding to the first user, when the reception means receives the search key information from one of the plurality of users, wherein the transmitted taste information or group information is not associated with the first user, the plurality of taste information includes page titles for music information pages and corresponding uniform resource locators (URLs) for the music information pages, the music information pages being selected by each of the plurality of users, and an overlap between the taste information of the first user and each of the plurality of taste information is determined and each of the plurality of taste information is displayed ordered in accordance with the determined overlap.

21. The information transmission apparatus according to claim 13, wherein the transmission means transmits the group information associated with the second user, for introduction to the first user, to the terminal apparatus corresponding to the first user, the transmitted group information not being associated with the first user and identifying an interest group to which the second user belongs.

* * * * *